Patented Oct. 22, 1935

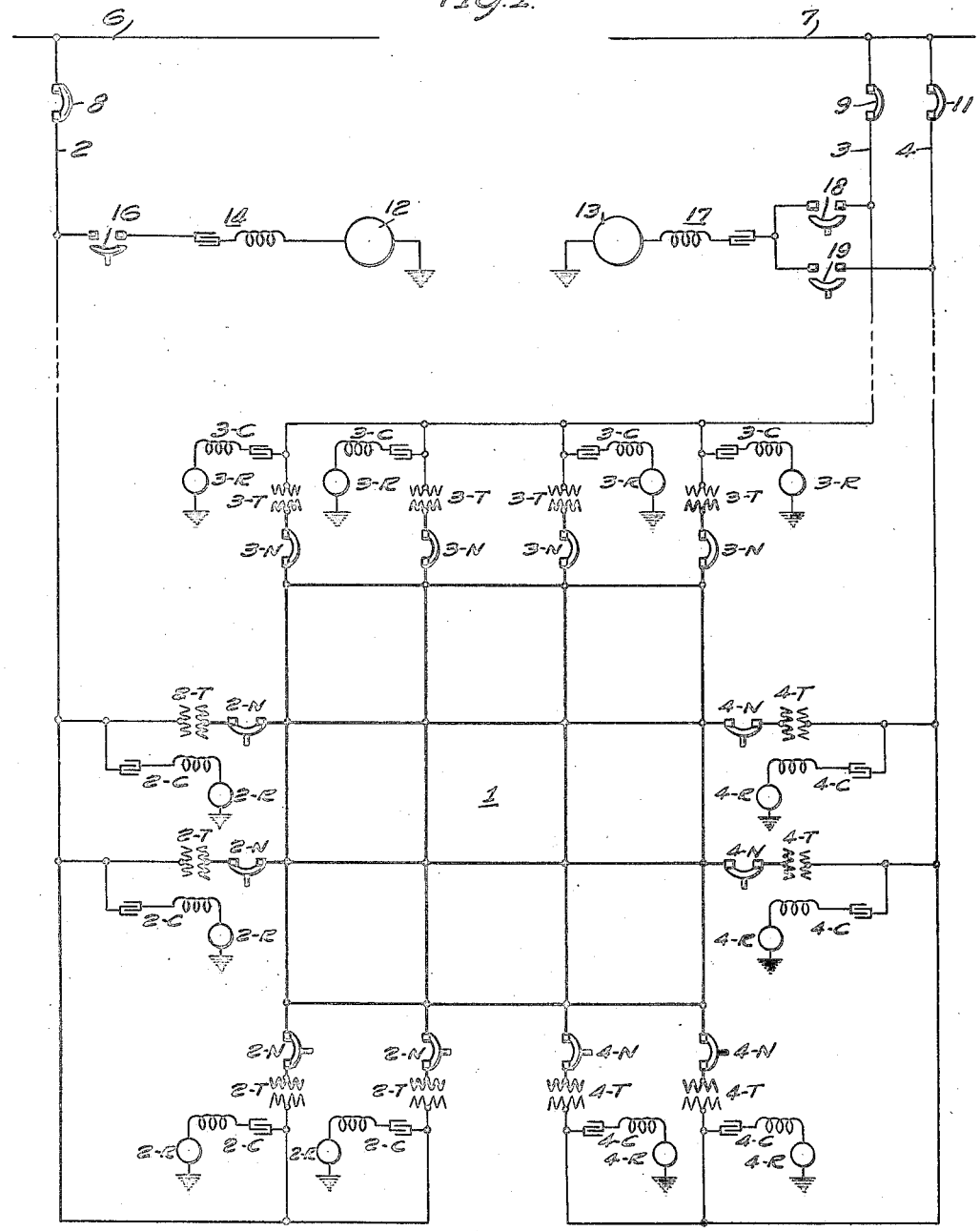

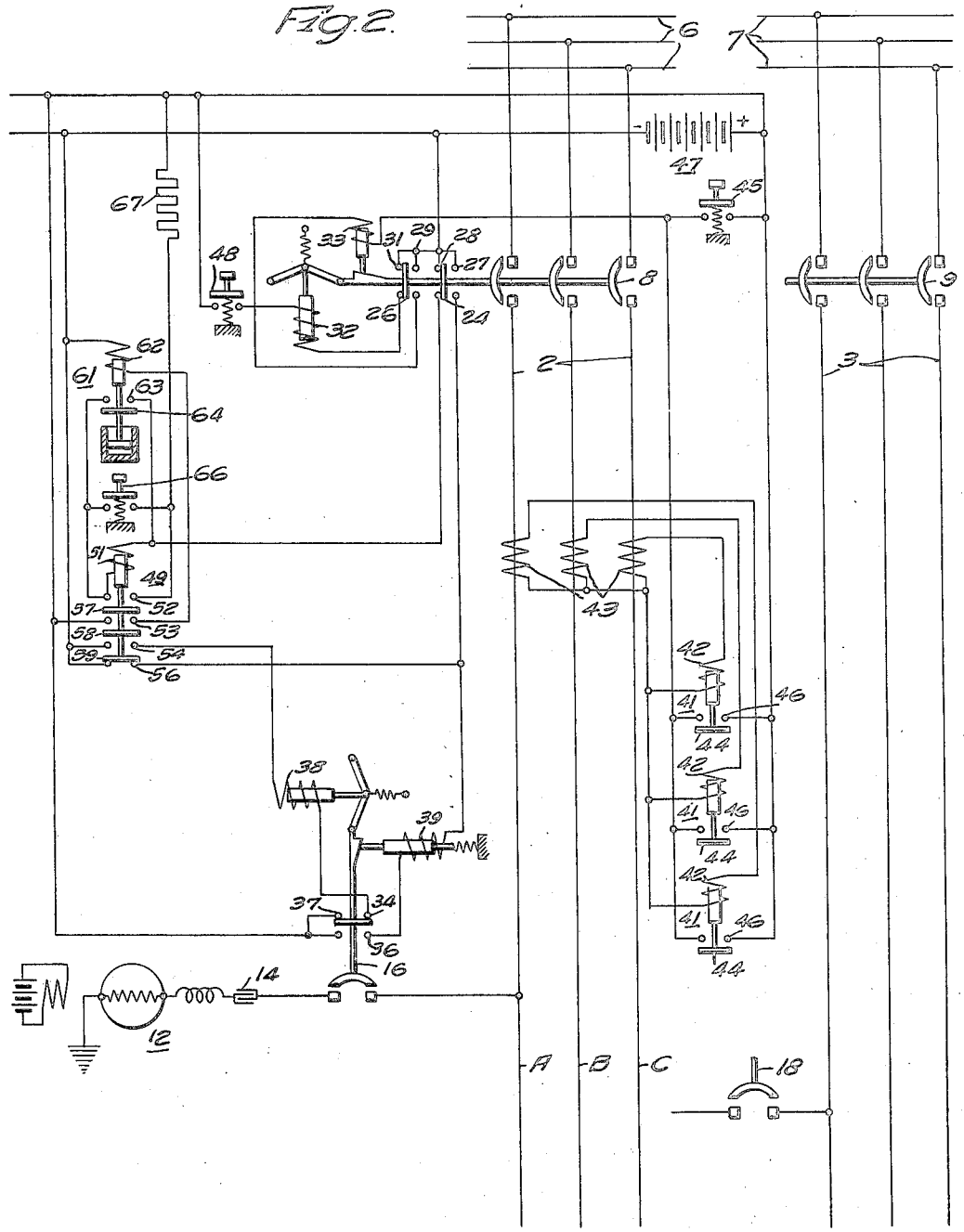

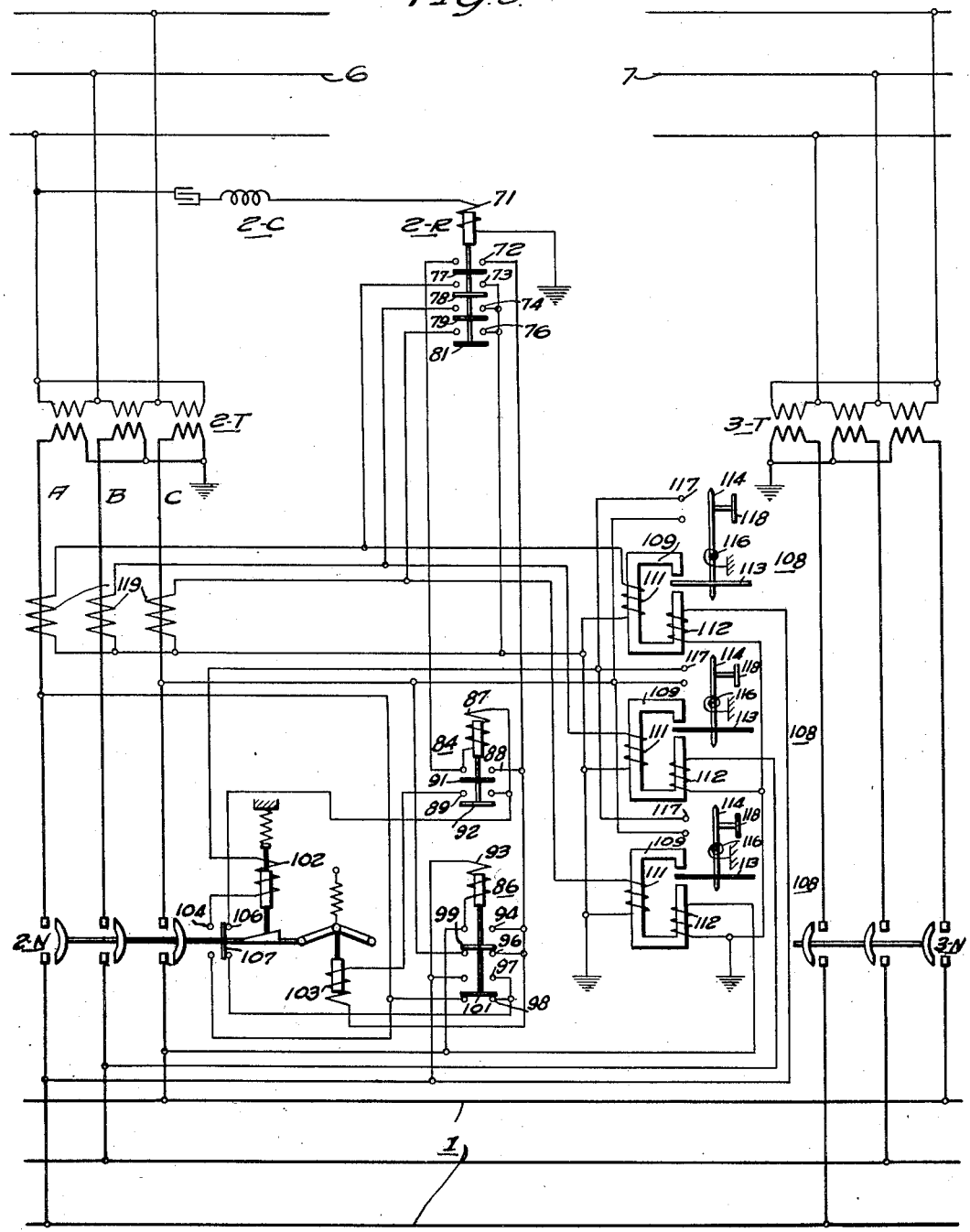

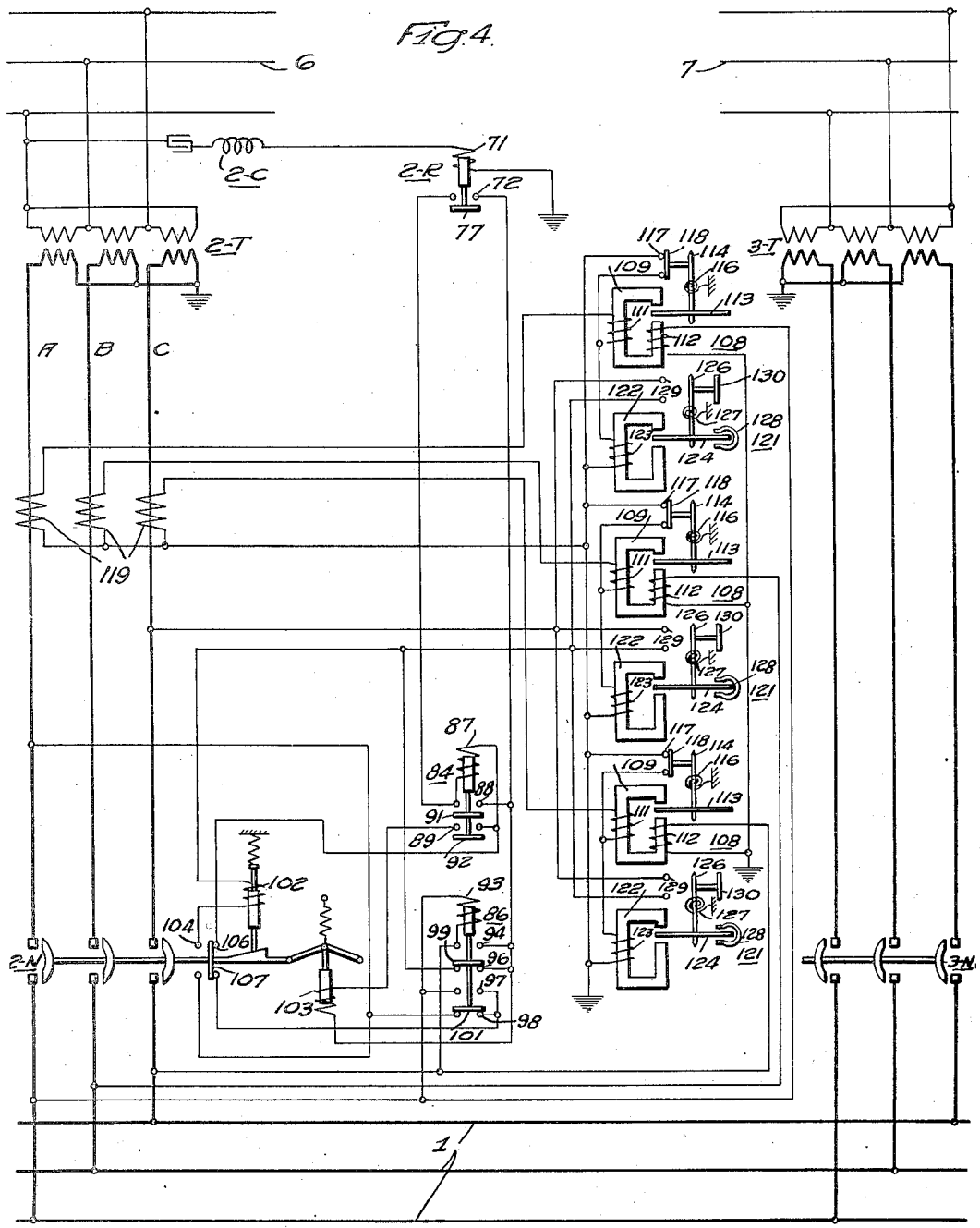

2,018,225

UNITED STATES PATENT OFFICE 2,018,225

NETWORK SYSTEM FOR DISTRIBUTION

John S. Parsons, Swissvale, Pa., assignor to Westinghouse Electric & Manufacturing Company, East Pittsburgh, Pa., a corporation of Pennsylvania Application July 30, 1932, Serial No. 627,081
Renewed February 26, 1935

13 Claims. (Cl. 175—294)

The present invention relates to a superimposed frequency system of control and protection for alternating-current network systems of distribution. The invention is a system of control and protection alternative to the control systems disclosed in my United States Patent No. 1,953,126, issued April 3, 1934, and my copending application Serial No. 627,082, both filed on July 30, 1932, and both assigned to Westinghouse Electric & Manufacturing Company.

In any high frequency arrangement for effecting the control and protection of an alternating-current network system of distribution, the provision of tuned circuits or blocking circuits in the respective feeders, supplying a common network load circuit may be objectionable from the standpoint of initial installation costs. Where such provision of tuned circuits or blocking circuits in the feeder circuits, supplying power to a network load circuit, may be objectionable for economic reasons or where existing network systems of distribution employ the usual sensitive or insensitive directional relay control means, the control system of the present invention may be employed and result in an improved control and protective means for such network systems of distribution.

It is an object of the present invention, therefore, to provide a high-frequency control and protective arrangement for an alternating-current network system of distribution wherein tuned circuits or blocking circuits are not necessitated in any of the feeders supplying power to the network load circuit.

Another object of the present invention is to provide a high-frequency control system for an alternating-current network system of distribution wherein the high-frequency or other-than-normal frequency control currents are applied to the respective feeders only for the purpose of effecting the closure of the network circuit-breakers associated with such feeder circuits.

Another object of the present invention is to effect the closing of the network circuit breakers associated with any particular feeder circuit when such feeder circuit is disconnected from its associated source or bus.

Another object of the present invention is to utilize directional relays of the sensitive or insensitive type for controlling the opening of the network circuit-breakers.

Another object of the present invention is to provide means, in conjunction with a superimposed frequency system of control, which permits the connection of a plurality of feeder circuits, energized from different sources or buses, to a common network load circuit.

A further object of the present invention is to effect the closing of the network circuit breakers, associated with any particular feeder circuit, only when the source of other-than-normal frequency currents is in proper condition for supplying the superimposed frequency currents to any of the feeder circuits.

A further object of the present invention is to apply the other-than-normal frequency control currents to any of the feeder circuits only for a predetermined time, such time-delay depending upon the characteristics of the particular network system of distribution to be controlled and protected.

Further objects and advantages of the present invention will become more readily apparent from a detailed consideration of the function and sequence of operation of the proposed control apparatus illustrated in the several drawings.

In the drawings, Figure 1 is a schematic single-line diagram of a typical alternating-current system of distribution employing the control system contemplated in the present invention;

Fig. 2 is a schematic diagram of the control means associated with a feeder circuit breaker in an alternating-current network system of distribution and the means of applying the other-than-normal frequency control currents to such feeder circuit.

Fig. 3 is a schematic diagram of the control circuit for a network circuit breaker utilizing sensitive directional relaying means.

Fig. 4 is a schematic diagram of the control circuit for a network circuit breaker utilizing insensitive directional relaying means.

Referring more particularly to Fig. 1, a network load circuit 1 is indicated as comprising a plurality of interconnected conductors for the purpose of supplying power to consumers at a proper utilization voltage and this network load circuit or grid 1 is indicated as being supplied with power from a plurality of feeder circuits 2, 3 and 4. The feeder circuit 2 is indicated as being energized from a source or bus 6, while the feeder circuits 3 and 4 are indicated as being energized in parallel from a second source or bus 7. The feeder circuit 2 is connected to the source or bus 6 by means of a feeder circuit breaker 8, and the feeder circuits 3 and 4 are connected to the second source or bus 7 by means of suitable feeder circuit breakers 9 and 11, respectively.

Each of the feeder circuits 2, 3 and 4 is connected to the network load circuit 1 through suitable distribution or step-down transformers and network circuit-breakers interposed between the secondary windings of such network transformers and the network load circuit. The respective network transformers, associated with any of the feeder circuit, are indicated by means of the reference numerals on the associated feeder circuit and the letter T. The network circuit breakers associated with the respective feeder circuits are indicated by the reference numeral of the associated feeder circuit and the letter N.

High-frequency relays are associated with each of the network transformer and network circuit breaker units and are indicated by the reference numeral of the associated feeder circuit and the letter R. The respective high-frequency control relays are connected to the feeder circuits on the primary side of the associated network transformer through suitable tuned circuits comprising series-connected capacitance and inductance units which are designated in the drawings by the reference numeral of the associated feeder circuit and the letter C.

Only the high-frequency control relays are illustrated in Fig. 1 of the drawings, and it is to be understood that such relays are provided only for the purpose of effecting the closure of their associated network circuit breakers. The control means for effecting the opening of the network circuit breakers comprises power directional relays of the usual sensitive or insensitive type or other equivalent devices known in the art, depending upon the characteristics desired in any particular network distribution system and such opening control means is not indicated in this figure of the drawings. Reference to one form of opening control means for the network circuit breakers will be considered hereafter with reference to Figs. 3 and 4 of the drawings.

The superimposed frequency control currents are impressed upon the respective feeder circuits supplying power to the network load circuit by means of high-frequency generators 12 and 13. The high-frequency generator 12 is adapted to be connected to the feeder circuit 2 through a tuned circuit 14, comprising a series-connected capacitance and an inductance, and through a circuit breaker 16. The second high-frequency generator 13 is adapted to be connected to the feeder circuits 3 and 4 through a tuned circuit 17, comprising an inductance and a capacitance, and through circuit breakers 18 and 19, respectively.

The circuit breakers 16 and 18, 19 are shown in their open positions, inasmuch as the feeder circuit breakers 8, 9 and 11 are shown in their closed positions, and the high-frequency generators 12 and 13 are normally disconnected from the respective feeder circuits 2, 3 and 4 when power is being delivered to the network load circuit 1 from such feeder circuits.

The general operation of the control and protective system contemplated in the present invention may be explained as follows. Assume the network load circuit 1 to be deenergized and the feeder circuit breakers 8, 9 and 11 to be in their open positions, the feeder circuit 3 may be connected to the network load circuit 1, by the central station operator, in the following manner.

The circuit breaker 18 is actuated to its closed position, thereby permitting the high-frequency currents to be applied to the feeder circuit 3 from the high-frequency generator 13. Immediately upon the application of such high-frequency currents, an energizing circuit for the high-frequency relays 3-R is completed from ground through the high-frequency generator 13, tuned circuit 17, circuit breaker 18, feeder circuit 3, tuned circuits 3-C, relays 3-R, and back to ground. The relays 3-R are, therefore, effectively energized to close their respective contacts and partially complete an energizing circuit for closing the network circuit breakers 3-N.

After the circuit breaker 18 is closed by the central station operator, the operator closes the feeder circuit breaker 9, thereby energizing the network transformers 3-T. The energization of the secondary windings of the transformers 3-T completes the energizing circuits for closing the network circuit breakers 3-N and the transformers 3-T are thereupon connected to supply power to the network load circuit 1.

As soon as the network circuit breakers 3-N are actuated to their closed positions, a mechanical latching means is effective to maintain such breakers in their closed position and the high-frequency relays 3-R are ineffective to cause any further actuation of the network circuit breakers.

As will be explained hereafter, the feeder circuit breaker 9 and the network circuit breakers 3-N are adapted to be actuated to their open positions by means of overcurrent and directional relays, respectively. The conditions under which such circuit breakers are actuated to their open position will also be detailed hereafter in a consideration of the specific control means provided for each breaker.

The sequence of control for connecting the feeder circuit 4 to the network load circuit 1 is the same as that explained with reference to the connection of the feeder circuit 3 to the network load circuit 1. Inasmuch as the two feeder circuits 3 and 4 are energized from the same source or bus 7, it is unnecessary to synchronize the two feeder circuits and, therefore, it is only necessary to effect the sequential closure of the circuit breakers 19 and 11.

Assuming the network load circuit 1 to be deenergized and that it is desired to connect the feeder circuit 2 to supply power to such network load circuit, the sequence of control operation is substantially the same as that described in connection with the feeder circuits 3 and 4. However, assuming the network load circuit 1 to be energized from the feeder circuits 3 and/or 4 and that it is desired to connect the additional feeder circuit 2 to supply power to the network load circuit 1, the sequence of control operation is as follows:

The central station operator effects the closure of the circuit breaker 16, thereby connecting the high-frequency generator 12 to the feeder circuit 2 through the tuned circuit 14 and the circuit breaker 16. Immediately upon the application of the other-than-normal frequency currents to the feeder circuit 2, the high-frequency relays 2-R, associated with such feeder circuit, are effectively energized and their associated network circuit breakers 2-N are actuated to their closed positions. Upon the closure of the circuit breakers 2-N, a voltage proportional to the network load circuit voltage is impressed on the network transformer side of the feeder circuit 2 and the central station operator synchronizes across the feeder circuit breaker 8. When the voltages of bus 6 and the feeder circuit 3 bear a predetermined permissible magnitude and phase-angle relation, the central station operator closes the feeder circuit breaker 8 and the source or bus 6 is synchronized with source or bus 7 through the network load circuit 1, and the feeder circuits 2, 3 and/or 4 are connected to supply power to the network load circuit 1.

Upon the closing of any of the feeder circuit breakers 8, 9 or 11, the circuit breakers 16, 18 or 19, respectively, are immediately opened to disconnect the high-frequency generators 12 and 13 from the respective feeder circuits. This disconnection of the high-frequency generators 12 and 13 is effected automatically as soon as the feeder circuit breakers, associated with the feeder circuits 2, 3 or 4, are actuated to their closed positions by the central station operator.

A time-delay feature is also included in the control circuit, associated with the feeder circuit breakers and the circuit breakers connecting the high-frequency generators to the feeder circuits and such time-delay is provided in order to effect the disconnection of the high-frequency generators in the event that the feeder circuit breakers are not actuated to their closed position for some reason or other.

The provision of this time delay avoids any possibility of the network circuit breakers remaining closed and the network load circuit supplying the losses in the associated transformers and feeder circuit when the feeder circuit breaker remains open. The high frequency generators are also automatically disconnected from their associated feeder circuits under condtions when a fault obtains on the feeder circuit and the associated network circuit breakers remain open.

When sensitive power directional relays are utilized for effecting the opening of the network switches, the high frequency relays are so connected and arranged as to prevent the effective energization of the power directional relays when the feeder circuit breaker remains open, or as long as the high frequency generator remains connected to the associated feeder circuit. This arrangement avoids any possibility of pumping of any of the network switches due to the failure of the central station operator to close the feeder circuit breaker or when the feeder circuit is faulty when the high frequency currents are applied thereto.

The control apparatus, associated with the feeder circuit breakers and the circuit breaker associated with the high-frequency sources adapted to be connected to such feeder circuits, is so arranged that the high-frequency generators may only be connected to the feeder circuits when the feeder circuit breakers, in such circuits, are in their open position.

The sequence of control for effecting the connection of one or more of the feeder circuits to the network load circuit will now be considered with reference to Fig. 2 of the drawings.

The feeder circuit breaker 8, associated with the feeder circuit 2, is provided with pallet switches 24 and 26 and stationary contacts 27, 28, 29 and 31. When the feeder circuit breaker 8 is in its open position, the pallet switch 24 is adapted to bridge the stationary contacts 28 and the pallet switch 26 is adapted to bridge the stationary contacts 31. However, when the feeder circuit breaker 8 is actuated to its closed position, the pallet switches 24 and 26 are moved out of engagement with the stationary contacts 28 and 31, respectively, and such pallet switches are adapted to bridge the stationary contacts 27 and 29, respectively.

The feeder circuit breaker 8 is also provided with suitable closing and tripping mechanisms, the closing mechanism including a closing coil or energizing winding 32 and the tripping mechanism including a tripping coil or energizing winding 33.

The circuit breaker 16, associated with the high-frequency generator 12, is provided with a pallet switch 34 and stationary contacts 36 and 37. When the circuit breaker 16 is in its open position, the pallet switch 34 is adapted to bridge the stationary contacts 37, and when the circuit breaker is in its closed position, the pallet switch 34 is adapted to bridge the stationary contacts 36. This circuit breaker is provided with suitable closing and tripping mechanisms, the closing mechanism including a closing coil or energizing winding 38 and the tripping mechanism including a trip coil or energizing winding 39.

The feeder circuit breaker 8 is adapted to be actuated to its open position in accordance with predetermined over-current conditions existing on the feeder circuit 2 as a result of faults or other abnormal system conditions. Over-current relays 41, having energizing windings 42 energized from star-connected current transformers 43, associated with the feeder circuit 2, are provided for the purpose of effecting the opening of the feeder circuit breaker 8 upon the occurrence of predetermined magnitudes of current flowing in the feeder circuit 2. Each of the over-current relays 41 is provided with moving contacts 44 and stationary contacts 46.

A suitable direct-current source, such as battery 47, is provided for control purposes and the stationary contacts 46, of the over-current relays 41, are connected in parallel and are adapted to effect the energization of the trip coil 33, associated with the feeder circuit breaker 8, by means of an energizing circuit including the source 47 when such feeder circuit breaker is in its closed position and a predetermined over-current condition exists on the feeder circuit 2. A push-button switch 45 is also associated with the trip coil 33 and the contacts thereof are adapted to complete a parallel circuit with the contacts of relays 41. The switch 45 is provided in order to enable the central station operator to disconnect the feeder circuit 2 during times of light load and/or when it becomes desirable to isolate the feeder circuit 2.

Assume first that the buses 6 and 7 are energized from the same source and that only the feeder circuits 2 and 3 are adapted to be connected to supply power to a common network load and, furthermore, that feeder circuit breakers 8 and 9 are in their open position; the manner of connecting the feeder circuit 2, to supply power to the network load circuit, will now be detailed.

Relays 49 and 61 and push button switch 66 are associated with the control circuits of the feeder circuit breaker 8 and the circuit breaker 16, and the relay 61 is provided with a dash-pot or other time-delay means, the time-delay imparted to such relay depending upon the particular characteristics desired in any alternating-current network system of distribution. The relay 49 is provided with an energizing winding 51, stationary contacts 52, 53, 54 and 56, and moving contacts 57, 58 and 59. The time-delay relay 61 is provided with an energizing winding 62, stationary contacts 63 and moving contact 64.

Since the feeder circuit 3 is not connected to the network load circuit and the network load circuit is completely deenergized, the central station operator closes the push button switch 66, thereby completing an energizing circuit for the winding 51 of relay 49. This energizing circuit may be traced from the positive terminal of the direct-current source 47, through a current-limiting resistance 67, push button switch 66, energizing winding 51, pallet switch 24 and stationary contacts 28 of the feeder circuit breaker 8, and thence to the negative terminal of the direct-current source 47. The relay 49 is thereby effectively energized to bridge the stationary contacts 52, 53 and 54 by the moving contacts 57, 58 and 59, respectively.

The bridging of stationary contacts 52 by the moving contact 57 completes a holding circuit for the energizing winding 51 and such holding circuit merely by-passes the contacts of the push button switch 66. The bridging of the stationary contacts 53 by the moving contact 58 sets up an energizing circuit for the winding 62 of the time-delay relay 61. This energizing circuit may be traced from the positive terminal of the direct-current source 47, stationary contacts 53 and moving contact 58 of the relay 51, energizing winding 62 of the time-delay relay 61, and thence to the negative terminal of the direct-current source 47.

The bridging of the stationary contacts 54 by the moving contact 59 completes an energizing circuit for the closing coil 38 of the circuit breaker 16. This energizing circuit may be traced from the negative terminal of the direct-current source 47, stationary contacts 54 and moving contact 59 of the relay 51, energizing winding 38 associated with the closing mechanism of the circuit breaker 16, stationary contacts 37 and pallet switch 34 of the breaker 16, and thence to the positive terminal of the direct-current source 47.

The circuit breaker 16 is thereupon actuated to its closed position and the pallet switch 34 is moved out of engagement with the stationary contacts 37, thereby open-circuiting the energizing circuit for the closing coil 38, and the stationary contacts 36 are bridged by the pallet switch 34.

The closing of the circuit breaker 16 connects the high-frequency generator 12 of phase A of the feeder circuit 2 through the tuned circuit 14, thereby applying the other-than-normal frequency currents to the feeder circuit 2. The high-frequency relays at the network load circuit end of the feeder circuit 2 are thereupon energized to effect the partial completion of the closing circuit of their associated network circuit breakers. The network circuit breakers are thereupon adapted to be actuated to their closed positions immediately upon the closure of the feeder circuit breaker 8.

Since the feeder circuit breaker 8 is in its open position, the other-than-normal frequency currents, applied to the feeder circuit 2 by the high-frequency generator 12, are not permitted to circulate in other parts of the network system even though no blocking circuits or tuned circuits are included in the feeder circuits.

After the circuit breaker 16 is actuated to its closed position, the central station operator closes the push button switch 48, associated with the energizing winding 32 of the feeder circuit breaker 8, and an energizing circuit for the winding 32 is thereby completed. This energizing circuit may be traced from the positive terminal of the direct-current source 47, through the push button switch 48, energizing winding 32, stationary contacts 31 and pallet switch 26 of the feeder circuit breaker 8, and thence to the negative terminal of the direct-current source 47. The feeder circuit breaker 8 is thereby actuated to its closed position and the pallet switches 24 and 26 bridge the stationary contacts 27 and 29, respectively.

The bridging of the stationary contacts 27 by the pallet switch 24 completes an energizing circuit for the trip coil 39, associated with the circuit breaker 16, and such energizing circuit may be traced from the negative terminal of the direct-current source 47, stationary contacts 27 and pallet switch 24 of the feeder circuit breaker 8, trip coil 39, stationary contacts 36 and pallet switch 34 of circuit breaker 16, and thence to the positive terminal of the direct-current source 47. The circuit breaker 16 is actuated to its open position and the high-frequency generator 12 is disconnected from the feeder circuit 2. It will be noted that whenever the feeder circuit breaker 8 is in its closed position, the circuit breaker 16 is actuated to its open position and the high-frequency generator 12 is never connected to the feeder circuit 2 when the feeder circuit breaker 8 is in its closed position.

Assuming the circuit breaker 8 to be actuated to its closed position before the end of the time required for the time-delay relay 61 to bridge the stationary contacts 63 by the moving contact 64, the opening of the stationary contacts 53 of the relay 49 effects the deenergization of the winding 62 of the time-delay relay 61. The winding 51 of the relay 49 is also deenergized inasmuch as the pallet switch 24 is moved out of engagement with the contacts 28 of the feeder circuit breaker 8 when the circuit breaker 8 is actuated to its closed position. The circuit across stationary contacts 52 of the relay 49 is also broken, thereby interrupting the holding circuit for the energizing winding 51 of the relay 49.

Assume now that the circuit breaker 16 has been actuated to its closed position as described hereinbefore and that the central station operator does not actuate the push button switch 48 to effect the closing of the feeder circuit breaker 8. The time-delay relay 61 is energized for a sufficiently long period to effect the bridging of its stationary contacts 63 by the moving contact 64. The bridging of the stationary contact 63 shunts the energizing winding 51 of the relay 49, thereby resulting in the effective deenergization of the relay 49 and the contacts 57, 58 and 59 are moved out of engagement with the stationary contacts 52, 53 and 54, respectively, while the stationary contacts 56 are bridged by the moving contact 59. The bridging of the stationary contacts 56 completes a tripping circuit for the trip coil 39 of the circuit breaker 16 and such energizing circuit may be traced from the negative terminal of the direct-current source 47, stationary contacts 56 and moving contact 59 of the relay 49, trip coil 39, stationary contacts 36 and pallet switch 34 of the circuit breaker 16, and thence to the positive terminal of the direct-current source 47.

The circuit breaker 16 is thereby actuated to its open position and the high-frequency generator 12 is disconnected from the feeder circuit 2. The tripping circuit completed by the stationary contacts 56 and moving contact 59, of the relay 49, is in parallel with the tripping circuit for the circuit breaker 16 which is completed through stationary contacts 27 and pallet switch 24, associated with the feeder circuit breaker 8. It follows, therefore, that the circuit breaker 16 is actuated to its open position to thereby disconnect the high-frequency generator 12 from the feeder circuit 2 when the central station operator does not actuate the push button switch 48 within a predetermined time after the application of the other-than-normal frequency control currents to the feeder circuit 2, and also when the feeder circuit breaker 8 is actuated to its closed position by the central station operator.

Upon the occurrence of any fault or predetermined abnormal current condition existing on the feeder circuit 2, one or more of the over-current relays 41 is effectively energized to bridge the stationary contacts 46 by the moving contact 44, with the result that a tripping circuit for the feeder circuit breaker 8 is completed, such circuit being traced from the positive terminal of the direct-current source 47, stationary contacts 46 and moving contacts 44 of one or more of the relays 41, trip coil 33, stationary contacts 29 and pallet switch 26 of the feeder circuit breaker 8, and thence to the negative terminal of the direct-current source 47. It follows, therefore, that the feeder circuit breaker 8 is actuated to its open position upon the occurrence of any fault or predetermined abnormal current condition on the feeder circuit 2 and the resultant effective energization of one or more of the over-current relays 41.

The opening of the network circuit breakers at the network load circuit end of the feeder circuit 2 is accomplished by suitable directional relays, the operation of which will be explained hereinafter with reference to Figs. 3 and 4 of the drawings. It may be noted, however, that such directional relays may be of either the sensitive or insensitive type and are not responsive to the other-than-normal frequency control currents in effecting the opening of their associated network circuit breakers.

In the event that the feeder circuits 2 and 3 are energized from different sources or buses, as indicated in Fig. 1 of the drawings, the sequence of operation of the control scheme, associated with the feeder circuit breaker 8 and the circuit breaker 16, is altered. Assume that the feeder circuit breaker 9 is in its closed position and that the feeder circuit 3 is supplying power to the network load circuit, to which the feeder circuit 2 is adapted to be connected, and that it is desired to connect the additional feeder circuit 2 to supply power to the same network load circuit. The control of the feeder circuit breaker 8 and the circuit breaker 16 is substantially as described hereinbefore.

Briefly, the central station operator effects the closing of the circuit breaker 16 to connect the high-frequency generator 12 to the feeder circuit 2 by actuating the push button switch 66. This application of the other-than-normal frequency control currents to the feeder circuit 2 results in the effective energization of the high-frequency relays at the network load circuit end of the feeder circuit 2. These high-frequency relays complete the closing circuits of their associated network circuit breakers with the result that these breakers are closed and a voltage, proportional to the network load circuit voltage, appears on the network transformer side of the feeder circuit breaker 8. The central station operator then synchronizes this network load circuit voltage and the voltage of the bus or source 6, and, when the respective voltages bear predetermined permissible magnitude and phase-angle relations, the operator actuates the push button switch 48 to effect the closing of the feeder circuit breaker 8. As explained hereinbefore, the closing of the feeder circuit breaker 8 results in the actuation of the circuit breaker 16 to its open position, thereby disconnecting the high-frequency generator 12 from the feeder circuit 2. The source or bus 6 is, therefore, synchronized with the source or bus 7 through the network load circuit.

The sensitive type relay control apparatus associated with the network circuit breakers and the network transformers is shown in Fig. 3 of the drawings. Inasmuch as the relay apparatus is similar for each of the network circuit breakers, only the control circuits for one of such circuit breakers are illustrated. The relay control apparatus is shown in conjunction with one of the network transformers 2-T and associated network circuit breaker 2-N, and the network transformer 2-T is adapted to supply power to the network load circuit 1 through the network circuit breaker 2-N. A second network transformer 3-T is illustrated as being adapted to be connected to the same network load circuit 1 through network circuit breaker 3-N.

The other-than-normal frequency control currents superimposed upon the respective feeder circuits, adapted to supply power to the network load circuit 1, are utilized only for the purpose of effecting the closure of the network circuit breakers 2-N and 3-N. In effecting the closing of the network circuit breaker 2-N, a suitable tuned circuit 2-C is associated with phase A of the feeder circuit on the primary side of the network transformer 2-T, and a high-frequency relay 2-R is so connected and arranged to be energized in accordance with such other-than-normal frequency currents. The high-frequency relay 2-R is provided with energizing winding 71, stationary contacts 72, 73, 74 and 76 and moving contacts 77, 78, 79 and 81.

The tuned circuit 2-C comprises a series-connected capacitance and an inductance connected to phase A of the feeder circuit on the primary side of the network transformer 2-T, and such series-connected circuit is connected to the energizing winding 71 of the high-frequency relay 2-R, and thence to ground.

Upon the application of the other-than-normal frequency control currents to the feeder circuit, associated with the network transformer 2-T, the energizing winding 71 of the high-frequency relay 2-R is effectively energized to bridge the stationary contacts 72, 73, 74 and 76 by the moving contacts 77, 78, 79 and 81, respectively, and upon the removal of the other-than-normal frequency control currents from the associated feeder circuit, the high-frequency relay 2-R is deenergized and the contacts 77, 78, 79 and 81 thereof are moved out of engagement with the stationary contacts 72, 73, 74 and 76, respectively. Relays 84 and 86 are associated with the control circuit for effecting the closure of the network circuit breaker 2-N, and the relay 84 is provided with an energizing winding 87, stationary contacts 88 and 89 and moving contacts 91 and 92. The relay 86 is provided with an energizing winding 93, stationary contacts 94, 96, 97 and 98, and moving contacts 99, 101.

The network circuit breaker 2-N is provided with suitable closing and opening mechanisms, the closing mechanism including a closing coil or energizing winding 103 and the opening or tripping mechanism including an energizing winding 102. The network circuit breaker 2-N is also provided with stationary contacts 104, 106 and pallet switch 107.

When the energizing winding 87, of the relay 84, is deenergized, the moving contacts 91 and 92 are out of engagement with the stationary contacts 88 and 89. However, when the winding 87 is effectively energized, the stationary contacts 88 and 89 are adapted to be bridged by the moving contacts 91 and 92, respectively. When the winding 93 of the relay 86, is deenergized, the moving contacts 99 and 101 thereof are adapted to bridge the stationary contacts 96 and 98, respectively. When the winding 93 is energized, the moving contacts 99 and 101 are adapted to bridge the stationary contacts 94 and 97, respectively.

When the network circuit breaker 2-N is in its open position, the pallet switch 107 is adapted to bridge the stationary contacts 106, and, when the network circuit breaker 2-N is actuated to its closed position, the pallet switch 107 bridges the stationary contacts 104.

In order to effect the opening of the network circuit breaker 2-N, directional relays 108 are provided. These directional relays are illustrated generically as being of the sensitive type and are shown schematically as comprising C-magnet structures 109, current windings 111, voltage windings 112, disc members 113, spindles or shafts 114, restraining springs 116, stationary contacts 117 and moving contacts 118. The springs 116 are provided for the purpose of maintaining the moving contacts 118 out of engagement with the stationary contacts 117 when the relays 108 are deenergized.

The current windings 111 are adapted to be energized in accordance with the magnitude and phase position of the current flowing in the respective phases of the circuit between the network transformer 2-T and the network load circuit 1. This energization of the current windings 111 is effected by means of star-connected current transformers having secondary windings 119, the star-connection point being grounded. The respective phases of the circuit between the network transformer 2-T and the network load circuit 1 are indicated from left to right as A, B and C. The voltage windings 112 of the directional relays 108 are adapted to be energized in accordance with the voltage of the respective phases A, B and C. These voltage windings 112 are each adapted to be connected in circuit from one of the phases to ground.

Assuming the network circuit breakers 2-N and 3-N to be in their open positions and that the network load circuit 1 is not energized from any other feeder circuits or network transformers, the manner of effecting the closure of the network circuit breaker 2-N is as follows. Upon the application of the other-than-normal frequency currents to the feeder circuit associated with the network transformer 2-T, the winding 71 of the high-frequency relay 2-R is effectively energized to bridge the stationary contacts 72, 73, 74 and 76 by the moving contacts 77, 78, 79 and 81, respectively. The stationary contacts 72, of the high-frequency relay 2-R, and the stationary contacts 88, of the relay 84, are connected in parallel and one terminal of the energizing winding 87, of the relay 84, is connected to one of the stationary contacts 88.

The remaining terminal of the energizing winding 87 is connected to one of the stationary contacts 89, of the relay 84, and to one of the stationary contacts 106 of the network circuit breaker 2-N. The remaining stationary contact 106 is connected to one of the stationary contacts 97 and 98 of relay 86. The remaining stationary contact 98, of the relay 86, is connected to phase A of the circuit between the network transformer 2-T and the network load circuit 1 on the transformer side of the network circuit breaker 2-N. The remaining stationary contact 97 is connected to phase A on the network load circuit side of the network circuit breaker 2-N and to one terminal of the energizing winding 93 of the relay 86. The remaining terminal of the energizing winding 93 is connected to one of the stationary contacts 94 and to phase C on the network load side of the network circuit breaker 2-N.

The remaining stationary contact 89, of relay 84, is connected to the remaining stationary contact 94, of relay 86, to one of the stationary contacts 96 and to one terminal of the energizing winding 103 associated with the closing mechanism of the network circuit breaker 2-N. The remaining terminal of the energizing winding 103 is connected to the remaining stationary contact 89 of relay 84. The remaining stationary contact 96, of relay 86, is connected to phase C on the network transformer side of the network circuit breaker 2-N.

The stationary contacts 117, of the directional relays 108, are connected in parallel and one of the parallel connections is electrically connected to phase C on the network transformer side of the network circuit breaker 2-N, while the remaining parallel connection is connected to one terminal of the energizing winding 102 associated with the tripping mechanism of the network circuit breaker 2-N. The remaining terminal of the energizing winding 102 is connected to one of the stationary contacts 104, of the network circuit breaker 2-N, and the remaining stationary contact 104 is connected to phase A on the network transformer side of the network circuit breaker 2-N.

Upon the effective energization of the winding 71, of the high-frequency relay 2-R, the stationary contacts 72 are bridged by the moving contact 77 and an energizing circuit for the winding 87, of relay 84, is completed, such energizing circuit being traced from phase C, of the network transformer 2-T, stationary contacts 96 and moving contact 99 of relay 86, stationary contacts 72 and moving contact 77 of relay 2-R, energizing winding 87, of relay 84, stationary contacts 106 and pallet switch 107 of the network circuit breaker 2-N, stationary contacts 98 and moving contact 101 of relay 86, and thence to phase A of the network transformer 2-T.

The energization of the relay 84 effects the bridging of the stationary contacts 88 and 89 by means of the moving contacts 91 and 92, respectively. The bridging of the stationary contacts 88 by the moving contact 91 completes a holding circuit for the energizing winding 87, of relay 84, thereby maintaining relay 84 in energized condition even if the parallel circuit, completed by the stationary contact 72 and moving contact 77 of the high-frequency relay 2-R is opened. The bridgeing of the stationary contacts 89 by the moving contact 92 completes an energizing circuit for the closing coil 103 of the network circuit breaker 2-N. This energizing circuit may be traced from phase A of the network transformer 2-T, stationary contacts 98 and moving contact 101, of the relay 86, stationary contacts 106 and pallet switch 107 of the network circuit breaker 2-N, stationary contacts 89 and moving contact 92, of relay 84, energizing winding 103 of the network circuit breaker 2-N, stationary contacts 96 and moving contact 99, of relay 86, and thence to phase C of the network transformer 2-T.

The closing coil 103 is thereby effectively energized to close the network circuit breaker 2-N and open the energizing circuit for the closing coil 103 by moving the pallet switch 107 out of engagement with the stationary contacts 106 and into engagement with the stationary contacts 104. The opening of the circuit across the stationary contacts 106 of the network circuit breaker 2-N also effects the deenergization of the winding 87 of relay 84, and, assuming the other-than-normal frequency control currents to be removed from the feeder circuit connected to the network transformer 2-T, the high-frequency relay 2-R is also deenergized and the contacts 77, 78, 79 and 81 are moved out of engagement with the stationary contacts 72, 73, 74 and 76, respectively. Inasmuch as the other-than-normal frequency control currents are applied to the feeder circuit only for the purpose of effecting the closure of the network circuit breaker 2-N and such control currents are removed from the circuit upon the closing of the feeder circuit breaker, associated with the feeder circuit supplying power to the network transformer 2-T, the high-frequency relay 2-R will be deenergized and the closing of the network circuit breaker 2-N effects the deenergization of the relay 84 and the closing winding 103 of the network circuit breaker 2-N.

Next assume the network circuit breaker 3-N to be in its closed position, the network transformer 3-T to be supplying power to the network load circuit 1, the network circuit breaker 2-N to be in its open position and the feeder circuit adapted to supply power to the network transformer 2-T to be disconnected from its associated bus or power source. The sequence of control for effecting the closing of the network circuit breaker 2-N will now be considered.

As explained hereinbefore, the central station operator connects the high-frequency generator to the feeder circuit associated with the network transformer 2-T, thereby effectively energizing the winding 71 of the high-frequency relay 2-R. The energization of this relay results in the bridging of the stationary contacts 72 by the moving contact 77, thereby completing an energizing circuit for the winding 87 of relay 84. This energizing circuit is somewhat altered from the circuit described hereinbefore when the network load circuit 1 was deenergized.

When the network load circuit 1 is energized from other network transformers, the winding 93, of relay 86, is energized to effect the bridging of stationary contacts 94 and 97 by the moving contacts 99 and 101, respectively. The energizing winding 93 is permanently connected across phases A and C of the network transformer 2-T on the network load side of the network circuit breaker 2-N. The resulting energizing circuit for the winding 87, of relay 84, is therefore, traced from phase A on the network load side of the network circuit breaker 2-N, stationary contacts 97, and moving contact 101 of relay 86, stationary contacts 106 and pallet switch 107 of the open network circuit breaker 2-N, energizing winding 87 of relay 84, stationary contacts 72 and moving contact 77 of the relay 2-R, stationary contacts 94 and moving contact 99 of relay 86, and thence to phase C on the network load side of the network circuit breaker 2-N.

The relay 86 is arranged to provide a proper potential for closing the network circuit breaker 2-N. Under conditions when the network load circuit 1 is deenergized and it is desired to connect the transformer 2-T thereto, the relay 86 remains deenergized and the contacts 96, 99 and 98, 101 thereof serve to partially complete the closing circuit of the network circuit breaker 2-N. However, the circuit breaker 2-N is not actuated to its closed position, under such conditions, until the central station operator closes the feeder circuit breaker and energizes the network transformer 2-T.

When the network load circuit 1 is energized and it is desired to connect the network transformer 2-T and associated feeder circuit to supply power thereto, it may be necessary for the central station operator to effect a synchronizing of the bus or source voltage with the network load circuit voltage across the open feeder circuit breaker. This requirement necessitates the closing of the network circuit breaker 2-N when the network load circuit 1 is energized and the feeder circuit breaker remains open. Under such system conditions the relay 86 is energized to provide network potential for closing the network circuit breaker 2-N.

The energizing of the winding 87, of the relay 84, effects the bridging of stationary contacts 88 and 99 by means of the moving contacts 91 and 92, respectively, and the bridging of stationary contacts 88 by the moving contact 91 completes a holding circuit for the winding 87. This holding circuit merely shunts the parallel-connected stationary contacts 72 of the high-frequency relay 2-R.

The bridging of the stationary contacts 89 by the moving contact 92, of relay 84, completes an energizing circuit for the closing coil 103 associated with the closing mechanism of the network circuit breaker 2-N. This energizing circuit may be traced from phase A on the network load side of the open network circuit breaker 2-N, stationary contacts 97 and moving contact 101 of relay 86, stationary contacts 106 and pallet switch 107 of the network circuit breaker 2-N, stationary contacts 89 and moving contact 92 of relay 84, closing coil 103 of circuit breaker 2-N, stationary contacts 94 and moving contact 99 of relay 86, and thence to phase C on the network load side of the network circuit breaker 2-N. As a result of the energization of closing coil 103, the network circuit breaker 2-N is actuated to its closed position and the pallet switch 107 is moved out of engagement with the stationary contacts 106, thereby deenergizing the winding 87 of the relay 84.

The closing of the network switch 2-N results in a voltage appearing on the primary side of the network transformer 2-T which is proportional to the voltage on the network load circuit 1. In accordance with the explanation detailed hereinbefore, the central station operator is required to synchronize the two voltages appearing on the opposite sides of the open feeder circuit breaker at the source or bus end of the feeder circuit adapted to supply power to the network transformer 2-T.

The high-frequency relay 2-R has the stationary contacts 73, 74 and 76 and the moving contacts 78, 79 and 81, thereof, so connected and arranged that the respective current transformer secondary windings 119 are adapted to be normally short circuited when the high-frequency control currents are applied to the feeder circuit associated with the network transformer 2-T. It may be noticed that as long as the relay 2-R remains energized the current transformer secondary windings 119 are short circuited by means of the relay contacts 73—78, 74—79 and 76—81.

This arrangement prevents any effective energization of the current windings 111 of the sensitive directional relays 108 until the feeder circuit, associated with the network transformer 2-T, is energized by the closing of the feeder circuit breaker by the central station operator. As stated hereinbefore, the closing of the feeder circuit breaker automatically results in the disconnection of the high-frequency control source from the feeder circuit with the resultant deenergization of the high-frequency relay 2-R and the removal of the short circuit connections for the current transformer secondary windings 119.

This short circuiting connection is provided in order to prevent pumping of the network circuit breaker 2-N when the sensitive directional relays 108 are employed, and the circuit breaker 2-N is to be closed when the net-work load circuit 1 is energized from other feeders or sources.

The necessity of employing such short circuiting means or some means for rendering the sensitive directional relays 108 inoperative when the network circuit breaker 2-N is closed, the network load circuit 1 is energized and the feeder circuit breaker is open, is clearly apparent because the network load circuit 1 is supplying magnetizing current for the network transformer 2-T. The sensitive directional relays 108 are adjusted to be effectively energized for such system energization conditions, and in view of such adjustment, the relays are made inoperative when the feeder circuit remains unconnected to its bus or source and/or when the other than normal frequency control currents are applied to the feeder circuit.

Inasmuch as the high frequency control currents are applied only for the purpose of effecting the closure of the network circuit breaker 2-N, and are not utilized for effecting any control in the event of fault or other abnormal system conditions, the sensitive directional relays 108 are provided and are operative to effect the opening of the network circuit breaker 2-N when both the feeder circuit breaker and the network circuit breaker are in their closed positions and a predetermined power flow exists from the network load circuit 1 to the feeder circuit 2.

Since the directional relays 108 are provided with a sensitive response setting, such that the relays will be effectively energized in accordance with current flowing to the network transformer 2-T from the network load circuit 1, commensurate with the magnetizing current for such transformer, the network circuit breaker 2-N will be actuated to its open position in response to the opening of the feeder circuit breaker by the central station operator.

Assuming a fault condition to occur on the feeder circuit associated with the network transformer 2-T or the opening of the feeder circuit breaker in such feeder circuit by the central station operator, the network load circuit 1 supplies power to the fault through the network transformer 2-T or supplies the magnetizing current for such transformer. In accordance with this abnormal direction of power flow, the resulting torque of the relays 108 is in the direction to effect the bridging of the stationary contacts 117 by the moving contacts 118. The bridging of the stationary contacts 117 by the moving contacts 118 completes a circuit for the tripping coil 102 of the network circuit breaker 2-N.

This energizing circuit may be traced from phase C on the network transformer side of the network circuit breaker 2-N, stationary contacts 117 and moving contacts 118 of one or more of the directional relays 108, tripping coil 102 of the network circuit breaker 2-N, stationary contacts 104 and pallet switch 107 of the circuit breaker 2-N, and thence to phase A on the network transformer side of the network circuit breaker 2-N. The network circuit breaker 2-N is then actuated to its open position, and the pallet switch 107 is moved out of engagement with the stationary contacts 104, thereby interrupting the energizing circuit for the tripping coil 102 and bridging stationary contacts 106, in order to partially complete the circuit for the closing coil 103 in the event that it is desired to reclose the network circuit breaker 2-N.

The directional relays 108, as indicated, are intended to be generic in character, and it is to be understood that any known type of sensitive relay means may be provided in order to effect the opening of the network circuit breakers in an alternating-current system of distribution.

In an alternating-current system of distribution employing insensitive directional relaying means, the control scheme shown in Fig. 4 of the drawings provides a complete and satisfactory control and protective means. The sequence of control, when insensitive directional relaying means are employed, will be detailed with reference to Fig. 4 of the drawings.

The control and protective scheme, shown in Fig. 4, is substantially similar to the control and protective scheme shown in Fig. 3 with the exception of the directional relaying means employed and the resultant simplification of the high-frequency responsive relay 2-R. The high-frequency relay 2-R is provided with stationary contacts 72 and moving contacts 77, and such contacting means are arranged and connected in a manner similar to the connection and arrangement of the contacting means 72 and 77 in the control scheme shown in Fig. 3.

Inasmuch as the directional relaying means shown in Fig. 4 are of the insensitive type, there is no possibility of the pumping of the network switch 2-N, when the network load circuit 1 is energized, the network switch 2-N is actuated to its closed position and the feeder circuit breaker associated with the feeder circuit connected to the network transformer 2-T remains in its open position. Since there is no possibility of pumping of the network switch 2-N under such system conditions, the short circuiting means for the current transformer secondary windings 119 is unnecessary, and the directional relays 108 may be energized directly at all times from the current transformer secondary windings 119.

The insensitive directional relaying means shown in Fig. 4 are represented schematically as including the usual sensitive type directional relays 108, similar to the directional relays 108 of Fig. 3, and additional overcurrent relays 121 which are provided in order to secure a high reverse current or insensitive setting of the directional relaying means.

The energizing means for the current and voltage windings 111 and 112, respectively, of the directional relays 108, are substantially the same as the energizing connections shown in Fig. 3, and the stationary contacts 117 are adapted to be bridged by the moving contacts 118 when the directional relays 108 are deenergized or power is flowing from the network transformer 2-T to the network load circuit 1.

The overcurrent relays 121 are illustrated as including C-magnet structures 122, current windings 123, disc members 124, spindles or shafts 126, spring-biasing means 127, magnetic damping means 128, stationary contacts 129 and moving contacts 130. The current windings 123 of the overcurrent relays 121 are connected in series with the current windings 111 of corresponding directional relays 108, and the current windings 123 are normally adapted to be short circuited by means of the bridging of the stationary contacts 117 by the moving contacts 118 of the directional relays 108.

Since the stationary contacts 117 are adapted to be bridged by the moving contacts 118 when the network transformer 2-T is delivering power to the network load circuit 1, and/or when the current transformer secondary windings 119 are deenergized, the overcurrent relays 121 are effectively deenergized and the stationary contacts 129 thereof are not adapted to be bridged by the moving contacts 130 due to the biasing action of the springs 127.

However, assuming a fault condition to occur on the feeder circuit associated with the network transformer 2-T, the network load circuit 1 will deliver power to such fault through the network transformer 2-T. The direction of current flow in the current transformer secondary windings 119 will be reversed and the moving contacts 118 of the directional relays 108 will be moved out of engagement with the stationary contacts 117, thereby permitting the energization of the current windings 123, of the overcurrent relays 121, in accordance with the current flowing in the current transformer secondary windings 119. The overcurrent relays 121 are provided with suitable response settings, such that for fault conditions occurring on the feeder circuit associated with the network transformer 2-T, or in the network transformer 2-T itself, the moving contacts 130 of one or more of the overcurrent relays 121 will be actuated to bridge their respective stationary contacts 129 to thereby result in the actuation of the network circuit breaker 2-N to its open position.

The stationary contacts 129 of the overcurrent relays 121 are connected in parallel, and the energizing circuit for the tripping coil 102 of the network circuit breaker 2-N may be traced from phase C on the network transformer side of the network circuit breaker 2-N through one or more of the stationary contacts 129 and moving contacts 130, of the overcurrent relays 121, energizing winding 102, of the network circuit breaker 2-N, stationary contacts 104 and pallet switch 107 of the circuit breaker 2-N, and thence to phase A on the network transformer side of the network circuit breaker 2-N.

It is to be understood that the combination of the directional relays 108 and the overcurrent relays 121 are utilized only for the purpose of providing an insensitive directional relaying means, and any suitable insensitive directional relaying means is understood as being contemplated in the scope of the present invention.

In the various figures of the drawings and in the foregoing description, reference has been made to the use of a single-phase high-frequency generator for applying other than normal frequency control currents to the respective feeder circuits. Obviously, a polyphase high-frequency generator, or any type of tube oscillator, or other than normal frequency means, may be employed for the control and protective means disclosed in the present invention, and provides substantially the same operating results.

Assuming a polyphase high-frequency generator to be utilized, it would be necessary to provide a plurality of high-frequency responsive relays 2-R in the Fig. 3 and Fig. 4 arrangements, and to connect the respective contacts thereof in parallel. Inasmuch as the provision of a plurality of relays 2-R in the Fig. 3 arrangement would result in an excessive number of relay contacts, an auxiliary relay could easily be provided for normally short circuiting the current transformer secondary windings 119, and the energization of such relay could be controlled in accordance with the energization of the high-frequency relays 2-R.

In the foregoing description of the control sequence included in the present invention, it will be noted that a complete control and protective system has been provided for an alternating-current system of distribution, wherein other than normal frequency control currents are utilized for effecting the closure of the network circuit breakers, while usual network or directional relays may be utilized in conjunction with such other than normal frequency control for effecting the opening of the network circuit breakers under predetermined system conditions, depending upon the characteristics of the particular network system to which the present invention is applied.

It may readily be seen, therefore, that the present invention may be utilized in existing alternating-current network systems and in any future network systems, wherein the control schemes of the prior art are objectionable from either an operating or an economical standpoint.

It is proposed, therefore, that the present invention shall not be limited to the specific embodiments disclosed in the present application, in view of the basic nature of such invention, and no limitations should be imposed thereon other than as indicated in the appended claims.

I claim as my invention:

1. In an alternating-current system of distribution, a supply circuit, a network load circuit, a network switch connecting said circuits, means for supplying other-than-normal frequency control currents to one of said circuits, and control means for said network switch, said control means including means directly responsive to a fault on said supply circuit for causing said switch to open, and closing means for said switch, said closing means including means responsive to said other-than-normal frequency currents.

2. In an alternating-current system of distribution, a supply circuit, a network load circuit, a network switch connecting said circuits, means for supplying other-than-normal frequency control currents to one of said circuits, and control means for said network switch, said control means including directionally responsive means for effecting the opening of said switch in response to a fault on said supply circuit, and closing means for said switch, said closing means including means responsive to said other-than-normal frequency currents.

3. In an alternating-current system of distribution including a supply circuit, a circuit breaker in said supply circuit, a network load circuit and a network switch connecting said circuits, the combination including a source of other-than-normal frequency currents, a circuit interrupter connecting said source with said supply circuit, control means for automatically controlling the actuation of said network switch including means responsive to the source currents for closing said network switch and power directional relay means for opening said network switch and means for closing said circuit interrupter.

4. In an alternating-current system of distribution including a supply circuit, a circuit breaker in said supply circuit, a network load circuit and a network switch connecting said circuits, the combination including a source of other-than-normal frequency currents, a circuit interrupter connecting said source with said supply circuit, control means for automatically controlling the actuation of said network switch including power directional relay means for opening said network switch, means for closing said circuit interrupter and means controlled by said circuit breaker for opening said circuit interrupter when said circuit breaker is closed.

5. In an alternating-current system of distribution including a supply circuit, a circuit breaker in said supply circuit, a network load circuit and a network switch connecting said circuits, the combination including a source of other-than-normal frequency currents, a circuit interrupter connecting said source with said supply circuit, control means for said network switch including means responsive to said source currents for closing said network switch and power directional relay means for opening said network switch, means for closing said circuit interrupter, relay means for opening said circuit interrupter after a predetermined time delay and means controlled by the closing of said circuit breaker for opening said circuit interrupter.

6. In an alternating-current system of distribution including a supply circuit, a circuit breaker in said supply circuit, a network circuit and a network switch connecting said circuits, the combination including a source of other-than-normal frequency currents, a circuit interrupter connecting said source with said supply circuit, control means for said network switch including closing means responsive to the source currents and opening means responsive to power flow from the network load circuit to the supply circuit, means for closing said circuit interrupter and means controlled by said circuit breaker for opening said circuit interrupter upon the closing of said circuit breaker.

7. In an alternating-current system of distribution including a supply circuit, a circuit breaker in said supply circuit, a network load circuit and a network switch connecting said circuits, the combination including a source of other-than-normal frequency currents, a circuit interrupter connecting said source with one of said circuits, control means for said network switch including a sensitive power directional relay for opening said network switch and closing means for said network switch including means responsive to said other-than-normal frequency currents.

8. In an alternating-current system of distribution including a supply circuit, a circuit breaker in said supply circuit, a network load circuit and a network switch connecting said circuits, the combination including a source of other-than-normal frequency currents, a circuit interrupter connecting said source with said supply circuit, control means for said network switch including closing means responsive to the source currents and sensitive power directional relay means for opening said network switch, means for closing said circuit interrupter, time-delay means for opening said circuit interrupter, means for closing said circuit breaker, means controlled by the closing of said circuit breaker for opening said circuit interrupter and relay means associated with said supply circuit and said circuit breaker for opening said circuit breaker under predetermined abnormal conditions of said supply circuit.

9. In an alternating-current system of distribution including a supply circuit, a circuit breaker in said supply circuit, a network load circuit and a network switch connecting said circuits, the combination including a source of other-than-normal frequency currents, a circuit interrupter connecting said source with one of said circuits, control means for said network switch including sensitive power directional means for opening said network switch, means for closing said circuit interrupter and means responsive to the source currents for rendering said sensitive power directional means ineffective when said circuit interrupter is closed.

10. In an alternating-current system of distribution including a supply circuit, a circuit breaker in said supply circuit, a network load circuit and a network switch connecting said circuits, the combination with a source of other-than-normal frequency currents, a circuit interrupter connecting said source with said supply circuit, control means for said network switch including closing means responsive to the source currents and sensitive power directional means for opening said network switch, said closing means being effective to render said opening means ineffectively energized when said circuit interrupter is closed, means for closing said circuit interrupter and means controlled by the closing of said circuit breaker for opening said circuit interrupter.

11. In an alternating-current system of distribution including a supply circuit, a circuit breaker in said supply circuit, a network load circuit and a network switch connecting said circuits, the combination including a source of other-than-normal frequency currents, a circuit interrupter connecting said source with one of said circuits, control means for said network switch including insensitive power directional means for opening said network switch and closing means for said network switch including means responsive to said other-than-normal frequency currents, means for closing said circuit interrupter and means controlled by said circuit breaker for opening said circuit interrupter when said circuit breaker is closed.

12. In an alternating-current system of distribution including a supply circuit, a load circuit and a circuit breaker connecting said circuits, the combination including a source of other-than-normal frequency currents, a circuit interrupter connecting said source with one of said circuits, control means for automatically controlling the actuation of said circuit breaker including closing means initiated by the source currents and insensitive power directional means for opening said circuit breaker and means for closing said circuit interrupter.

13. In an alternating-current system of distribution including a supply circuit, a circuit breaker in said supply circuit, a network load circuit and a network switch connecting said circuit, the combination including a source of other-than-normal frequency currents, a circuit interrupter connecting said source with said supply circuit, control means for said network switch including closing means initiated by said source currents and insensitive power directional means for opening said network switch, means for closing said circuit interrupter, time delay means for opening said circuit interrupter, means controlled by the closing of said circuit breaker for opening said circuit interrupter and relay means associated with said supply circuit and said circuit breaker for opening said circuit breaker under predetermined system conditions.

JOHN S. PARSONS.